Oct. 10, 1961 R. H. CRAMER ET AL 3,003,952
MANUFACTURE OF PLATINUM-ALUMINA REFORMING CATALYST
Filed Nov. 4, 1957 2 Sheets-Sheet 1

FIG. 1

INVENTORS
Robert H. Cramer
BY Edward J. Rosinski
Raymond W. Barclay
ATTORNEY 3,003,952
MANUFACTURE OF PLATINUM-ALUMINA
REFORMING CATALYST
Robert H. Cramer, Woodbury, and Edward J. Rosinski, Almonesson, N.J., assignors, by mesne assignments, to Engelhard Industries, Inc., Newark, N.J., a corporation of Delaware
Filed Nov. 4, 1957, Ser. No. 694,219
17 Claims. (Cl. 208—138)

This invention relates to the manufacture, composition and use of a platinum metal-containing catalyst wherein a minor proportion of a platinum metal is combined with a major proportion of alumina to yield a resulting catalytic composite characterized by enhanced activity in the reforming of petroleum hydrocarbons. More specifically, the present invention is directed to the manufacture of a platinum-alumina reforming catalyst in which alumina produced by the reaction of high purity metallic aluminum with water in the presence of mercury under particular conditions of pH and temperature is combined, while in the form of an aqueous slurry, with a compound of platinum and thereafter dried and calcined.

Various methods have heretofore been desccribed for the production of platinum-alumina reforming catalysts according to which an alumina hydrate is precipitated from an aqueous solution of a soluble aluminum compound such as aluminum chloride, aluminum sulfate or sodium aluminate by the addition of ammonium hydroxide solution or, in the case of sodium aluminate solution, by addition of ammonium chloride solution. The alumina precipitate, so obtained is then washed, with intermediate filtration, to a low concentration of extraneous ions, such as sodium, ammonium, or chloride. Platinum metal is then incorporated in the resulting filter cake of alumina by addition thereto of an aqueous solution of a soluble or dispersible platinum metal-containing compound. Methods involving the foregoing steps have required extensive washing and filtration of the alumina in order to remove substantially all impurities therefrom before the same is brought into contact with the platinum-metal containing solution. Such washing and filtration has been a tedious time-consuming operation requiring the careful attention of operators, imposing an economic burden on the overall method of catalyst manufacture. In addition, the above employed methods have, due to the operational steps involved, not always afforded a consistently uniform product of requisite reforming activity.

It is an object of this invention to provide a process for manufacturing a platinum metal-containing reforming catalyst which eliminates the need for the aforementioned washing and filtration. A further object of the invention is the provision of a commercially attractive method for manufacturing a catalytic composite of alumina and a platinum metal. A still further object is the provision of an improved platinum-alumina reforming catalyst. A very important object is the provision of a reforming process utilizing such catalyst whereby improved yields of high octane gasoline are achieved.

The above and other objects which will be apparent to those skilled in the art are attained in accordance with the present invention wherein alumina produced by the reaction of metallic aluminum with water in the presence of mercury or a mercury compound at a temperature within the range of 60 to 150° F. and at a pH between about 7 and about 10 to yield an aqueous slurry having a solids content of 10 to 20 percent alumina is directly combined without intermediate washing or filtration with a solution of a platinum metal compound and thereafter dried and calcined.

One embodiment of the present invention involves a process for the production of a platinum-alumina catalyst by contacting substantially pure aluminum metal in a form having a large exposed surface area, i.e. greater than about 1000 square inches per pound with an excess of liquid water, in the absence of an acid, and in the presence of metallic mercury or mercury compound in a catalytic amount corresponding to from 0.1% to 10% by weight of mercury relative to the amount of aluminum at a temperature in the range of 60° F. to 150° F. and at a pH in the range of 7 to 10 until at least a major portion of the aluminum metal is converted into alumina slurried in the excess water. The resulting slurry of alumina in water is brought into contact, generally with agitation, with a solution of a platinum compound and the composite so obtained is thereafter dried and calcined. Hydrogen is produced as a by-product of this reaction and may serve, as hereinafter described, as a supplementary source of hydrogen for reforming with the resultant catalyst.

The process of the invention is advantageous since the precipitate of alumina formed is free from impurities and further may be directly impregnated with the platinum metal compound in the form of the slurry obtained without undergoing intermediate filtering, washing, drying and/or calcining operations.

In a specific embodiment of the process of the present invention, aluminum metal in the form of finely divided particles having a surface area greater than about 1000 square inches per pound is reacted with water, in the liquid phase, in amount at least sufficient to cover the aluminum in the presence of mercury or a mercury compound in an amount corresponding to from about 0.1 to about 1% by weight of mercury relative to the amount of aluminum until the aluminum is substantially completely converted into alumina and thereafter impregnated with a sufficient quantity of a platinum metal compound to afford after drying and calcining a resultant composite of alumina containing from about 0.01 to about 5 percent by weight of a platinum metal.

In another embodiment of the present invention, the alumina is produced by reacting substantially pure aluminum with a solution of a mercury compound at a temperature within the range of 110° F. to 140° F. and at a pH within the approximate range of 8 to 9.5 until the aluminum metal is converted into alumina and thereafter contacted with a platinum compound and then with hydrogen sulfide to fix the platinum on the alumina as platinum sulfide. The platinum impregnated alumina is then dried at a temperature between about 240° F. and 450° F. and thereafter calcined in air at 650° F. to 1000° F. to yield a resultant composite of alumina and platinum.

In still another embodiment of the invention, substantially pure aluminum metal is covered with a dilute solution of mercuric chloride in an amount corresponding to between about 0.25 percent and about 0.50 percent by weight of the aluminum until the aluminum is converted into alumina. The resulting slurry is then contacted with chloroplatinic acid in an amount and concentration sufficient to deposit between 0.01 and 1 percent by weight of platinum on the alumina, after which the composite is dried and calcined.

The aluminum metal used in production of the alumina slurry may be any substantially pure aluminum. If, an alumina product of high purity is desired, it is generally preferable to employ high purity aluminum. It is also within the scope of the present invention to use certain aluminum alloys, although aluminum containing even minor proportions of copper has been found to be insufficiently reactive for use in the instant process. However, since the process will afford a slurry of practically pure alumina, it is a preferred embodiment of the invention to effect reaction between aluminum metal having a purity of at least 99.75% and generally 99.99% or greater with substantially pure water, such as distilled water, to produce a resulting aqueous slurry of high purity alumina.

The physical form of the aluminum metal determines, to a marked degree, the rate of reaction between the aluminum and water. Other conditions remaining constant, the higher the surface area of the aluminum exposed to the water, the faster is the rate of reaction. Accordingly, it is generally preferable to use aluminum having a large exposed surface area particularly in the form of pieces having at least one dimension of substantially not more than 0.008 inch. Aluminum in sheet or ribbon form, as well as granulated or pelleted aluminum, is also suitable. Also, aluminum in the form of large pieces or ingots may be employed, if time of reaction is not important. However, it is generally preferred that the aluminum used have a surface area in excess of 1000 square inches per pound.

Mercury or a mercury compound is necessarily present during the reaction of aluminum and water to accelerate the reaction forming the desired slurry of alumina. It would appear that amalgamated aluminum is formed upon contact of the aluminum with mercury or a mercury compound. The latter upon reaction with aluminum undergoes reduction to metallic mercury. Thus, mercuric chloride reacts with the aluminum to form metallic mercury and aluminum chloride. In similar fashion, mercuric oxide reacts with the aluminum to produce alumina and metallic mercury. When a mixture of mercuric oxide and mercuric chloride is used, the resulting products are alumina, aluminum chloride and metallic mercury.

The mercury compound or mercury is generally present in catalytic amounts, generally, corresponding to an amount of mercury of between about 0.1% and about 10% by weight of the aluminum. Particularly, it is preferred to employ an amount of mercury or mercury compound with respect to the quantity of alumina slurry produced such that all of the mercury introduced is physically contained by occlusion, adsorption or other means in the resultant alumina slurry. The use of such amounts of mercury or mercury compound corresponding to an amount of mercury of between about 0.1% and about 1% by weight of the aluminum, have been found to be particularly desirable since the necessity of physically settling out mercury from the alumina slurry formed such as is essential with the use of much larger quantities of mercury or mercury compound, is thereby eliminated.

In addition to metallic mercury, the mercury compound employed is selected from the following group and may be a mixture of two or more of these compounds: mercuric acetate, mercuric bromide, mercuric chloride, mercuric iodide, mercuric fluoride, mercuric nitrate, mercuric oxide, mercuric benzoate, mercuric oxalate, mercurous carbonate, mercuric chlorate, mercurous acetate, mercuric bromate, mercurous bromate, mercurous bromide, mercurous fluoride, mercurous oxide, mercurous sulfate, mercuric sulfate, mercurous nitrate and the like. The above list is not considered exhaustive since it is further contemplated that basic mercuric salts, complexes of mercury compounds, and other inorganic or organic mercury compounds may also be used. Preference, however, is accorded mercuric chloride and particularly dilute aqueous solutions thereof containing an amount of mercuric chloride corresponding to between about 0.25 percent and about 0.50 percent by weight of the aluminum. The use of mercuric chloride has been found to result in formation of amalgamated aluminum at a faster rate than certain other of the mercury compounds tested permitting use of the above indicated small amounts. The alumina slurry obtained, moreover, with use of the above small amounts of mercuric chloride is substantially free of chlorine. It is, in fact, a preferred embodiment of the invention to maintain the halogen content of the alumina before impregnation with platinum compound substantially below 0.1% and particularly below 0.05% by weight. This is in contradistinction to previous methods for preparing an alumina-platinum catalyst, for example by precipitating aluminum chloride with ammonium hydroxide to yield alumina which is thereafter treated to incorporate therein a quantity of combined halogen in the amount of 0.1 to 8 percent by weight before the composite is combined with platinum. In the present method of manufacture of a platinum-alumina catalyst, treatment or control of the alumina to include specified amounts of halogen therein has not been found necessary.

As indicated above, the velocity of reaction of the aluminum is dependent upon the extent of exposed surface area of the aluminum and also on the amount of mercury or mercury compound present in the reaction mixture. The reaction speed is further dependent on the degree of agitation or the rate at which fresh surfaces of aluminum are exposed to contact with the water. It may accordingly be desirable to effect agitation in the reaction mixture forming the alumina slurry. In some instances, it may be desirable to ball mill the aluminum metal continuously or intermittently in the water containing mercury or mercury compound to thereby expose fresh surfaces of the aluminum metal to amalgamation and subsequent reaction to alumina.

Figure 1:
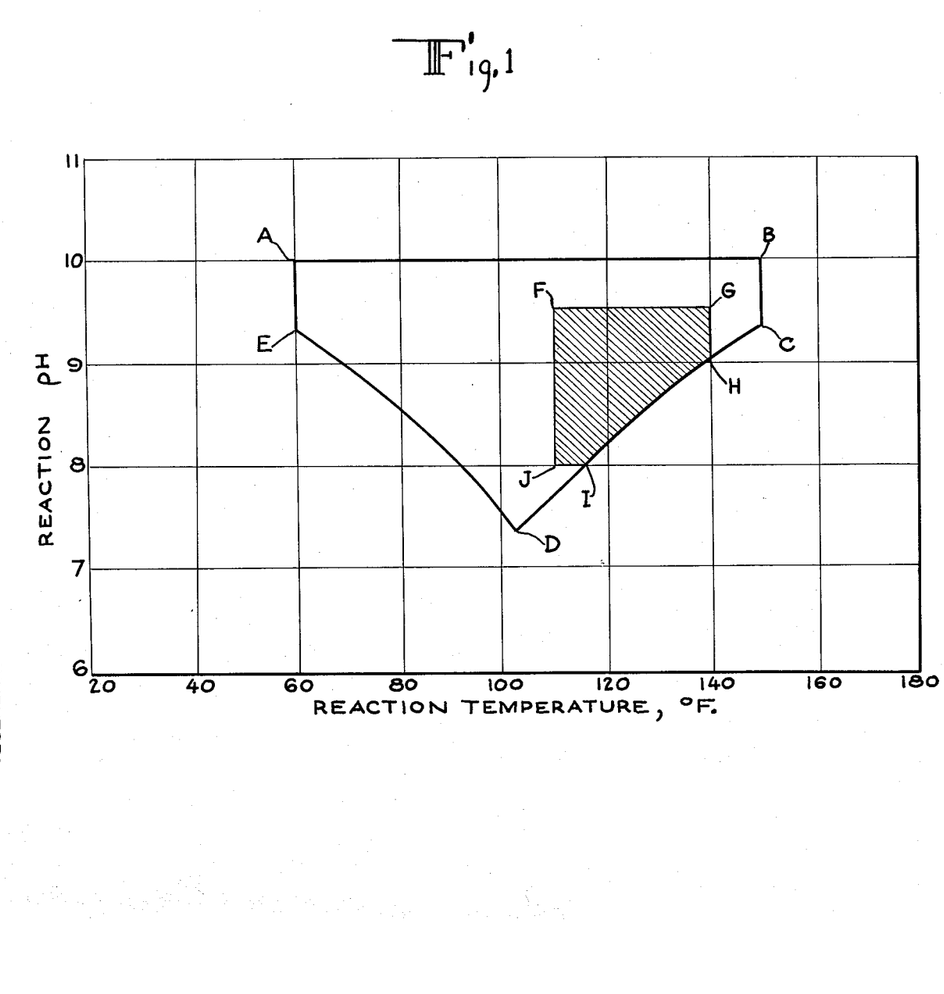

Temperature and pH of the reaction mixture are other important variables affecting the velocity and course of the reaction between aluminum and water. It is a particular feature of the present invention that the temperature of the reaction mixture forming alumina slurry be closely controlled within the range of 60° F. to 150° F. with maintenance of the pH of the reaction mixture within the range of about 7 to about 10. It is especially preferred to maintain the reaction temperature within the range of 110° F. to 140° F. with a pH of between about 8 and about 9.5. The pH of the reaction mixture may be adjusted by the addition of suitable compounds which do not interfere with the desired course of the reaction such as for example aluminum chloride, ammonium hydroxide, ammonium carbonate, urea and the like. The use of volatile compounds such as the ammonia-containing or ammonia-producing compounds will generally be employed when the addition of an additive material is necessary. In FIGURE 1 of the accompanying drawing, the pH of the reaction mixture is plotted against the reaction temperature in degrees Fahrenheit. Referring to this figure, it is a preferred embodiment of the invention to control the temperature of the reaction mixture in which alumina is formed at between 60° F. and 150° F. and the pH thereof between 7.4 and 10, said reaction temperature and pH being correlated to lie within the area ABCDE of FIGURE 1. It is a specifically preferred embodiment of the invention to control the reaction temperature within the range of 110° F. to 140° F. and the reaction pH within the range of 8 to 9.5, which reaction temperature and pH is correlated to lie within the area FGHIJ of FIGURE 1. It has been found that under the aforementioned conditions of temperature and pH that the resulting alumina slurry obtained upon impregnation with platinum compound, drying and calcination afforded a resulting platinum-alumina catalyst of enhanced activity when employed in the reforming of petroleum hydrocarbons.

It is another feature of the invention that an excess of water in the liquid phase be present in the reaction mixture for forming the alumina slurry. Generally, it is preferred that an amount of water be employed such as to afford a resulting slurry of alumina having a solids content of 10 to 20 percent by weight. Such slurry can, under the conditions of this invention, be directly impregnated with a solution of a platinum compound without subjecting the alumina to an intermediate filtration or drying operation. Impregnation of the alumina while in the form of an aqueous slurry of above solids content assures intimate contact and good mixing between the alumina and platinum impregnant leading to a reproducible product of consistently uniform characteristics.

The reaction between water and aluminum is preferably carried out for such period of time until the aluminum is essentially entirely converted to alumina. Under such conditions, conversion of the aluminum to hydrous alumina is essentially complete and no separation of unreacted aluminum metal from the resulting slurry of alumina is required. Thus, the alumina formed need not be purified by filtering and water washing. These latter steps are unnecessary since no undesirable foreign non-volatile materials are introduced during the preparation of the alumina. The absence of such undesirable foreign materials in the alumina slurry produced is, in fact, a feature of the process of the invention. A small amount of residual metallic mercury to the extent of 0.05 to 0.5 percent by weight of the alumina may be present after formation of the alumina slurry. This small amount of mercury is removed during the subsequent drying and/or calcination steps in the catalyst manufacture. In some instances it has been found desirable to remove the small amount of mercury from the alumina slurry before impregnation with platinum compound by boiling the slurry for 0.5 to 6 hours. Such treatment has been found sufficient to drive off substantially all residual mercury from the alumina so that the mercury content thereof is less than 100 parts per million. Alternatively, it has been found that substantially all residual mercury may be removed from the alumina slurry before impregnation thereof by bubbling steam therethrough, generally for a period of from about 0.5 to about 2 hours.

The slurry of alumina so obtained is thereafter contacted with a platinum metal compound. Thus, compounds of metals of the platinum group may be suitably combined with the slurry of alumina including compounds of platinum, palladium, ruthenium, osmium, rhodium and iridium or mixtures of two or more such compounds. Platinum is a particularly desirable metal component to be combined with the alumina since the composites of platinum and alumina prepared under the conditions of the invention have been found to be very active, particularly when the catalyst is to be employed in reforming operations. The platinum group metal may be composited with the alumina slurry in any suitable manner. With platinum, a preferred method of introduction is to contact the slurry of alumina with a solution of chloroplatinic acid while stirring and to thereafter pass hydrogen sulfide gas through the slurry with continued stirring forming platinum sulfide. Another suitable method for introducing platinum into the alumina slurry is to form a separate aqueous solution of chloroplatinic acid and to introduce hydrogen sulfide gas into this solution until the chloroplatinic acid solution undergoes no further changes in color upon addition of more hydrogen sulfide. Thus, chloroplatinic acid solution is normally light yellow and upon addition of hydrogen sulfide gas turns to a dark brown color. Apparently, the chloroplatinic acid and hydrogen sulfide react to form one or more complexes or chemical compounds. The brown solution of chloroplatinic acid and hydrogen sulfide may then be combined with the slurry of alumina.

Although platinum is preferrably introduced as a solution of chloroplatinic acid, other suitable platinum solutions may be employed. Thus, solutions or suspensions of platinum cyanide, platinum sulfide, platinum hydroxide or platinum oxide may be used. In cases where the solution of platinum metal compound is not soluble in water, other suitable solvents such as alcohols, ethers, etc. may be used. The platinum appears to enter into association with the alumina affording a resulting composite having the ability to catalytically promote the reforming of petroleum hydrocarbons. Contact of alumina in the form of a slurry with the platinum metal compound under the conditions of the invention is thus particularly desirable since intimate admixture of the two components is thereby achieved. The concentration of metal of the platinum group in the final composite will generally be within the range of from 0.01% to 1% by weight of the final catalyst.

After impregnation of the alumina slurry with platinum metal compound, the resulting composite is subjected to drying at temperatures within the range of 240° F. to 450° F. for at least 6 hours and up to 24 hours or more with a slow stream of air circulated to carry off the water vapor. The product from the drying operation has a solids content usually within the range of 50 to 68%. The resulting composite may be used as rough granules or the dried material may be ground and utilized as fine powder or the dried composite may be ground, for example to a particle size of 325 mesh (Tyler) or finer, mulled with water or mixed with a suitable lubricant, such as stearic acid and formed into pellets. It has also been found feasible to admix the dried product with a portion of the previously prepared platinum metal impregnated slurry to form an extrudable material which may thereafter be formed into pellets.

The granules or pellets so obtained are suitably subjected to a high temperature treatment or calcination at a temperature between about 650° F. and about 1000° F. for a period of between about 2 and about 36 hours. It is preferred that the calcining operation be conducted to minimize contact time of the catalyst with water vapor at the high temperatures encountered. The product, after drying, generally contains from about 32 to about 50 percent of water which is driven off at temperatures above 600° F. It is particularly preferred to heat the catalyst at a rate of 1 to 10° F. per minute up to 650° F. with an air flow through the catalyst bed, followed by calcining at the same rate to the final calcination temperature, within the range of 650° F. to 1000° F. While the calcination or heat treatment will generally be conducted in air, it is also feasible, although generally less desirable, to carry out the same in other oxidizing atmospheres, a reducing atmosphere such as for example, hydrogen or methane or an inert atmosphere such as nitrogen. In some instances, it may be desirable to carry out the calcination initially in air followed by heat treatment in an atmosphere of hydrogen. Any remaining mercury introduced during the alumina formation and not previously removed, is driven off during the drying and calcination operations and suitably is condensed out of the exit gases.

The product is finally cooled to yield the finished catalyst of alumina combined with platinum metal. Where chloroplatinic acid was used as the impregnating solution, the catalyst will also contain a small amount of chlorine substantially equal to the amount of platinum contained in the composite. As has been indicated above, it is not essential to activate the alumina, prepared by the method described herein, with halogen prior to impregnation thereof with platinum metal compound. The particular mercury compound employed in formation of the alumina slurry may also serve to introduce a small amount of other ion therein. Thus, with the use of a mercury halide, the resulting catalytic composite will generally contain a residual small amount of halogen attributable to such source. The presence of halogen in the final catalyst has not been found to adversely affect the catalytic characteristics thereof.

Figure 2:
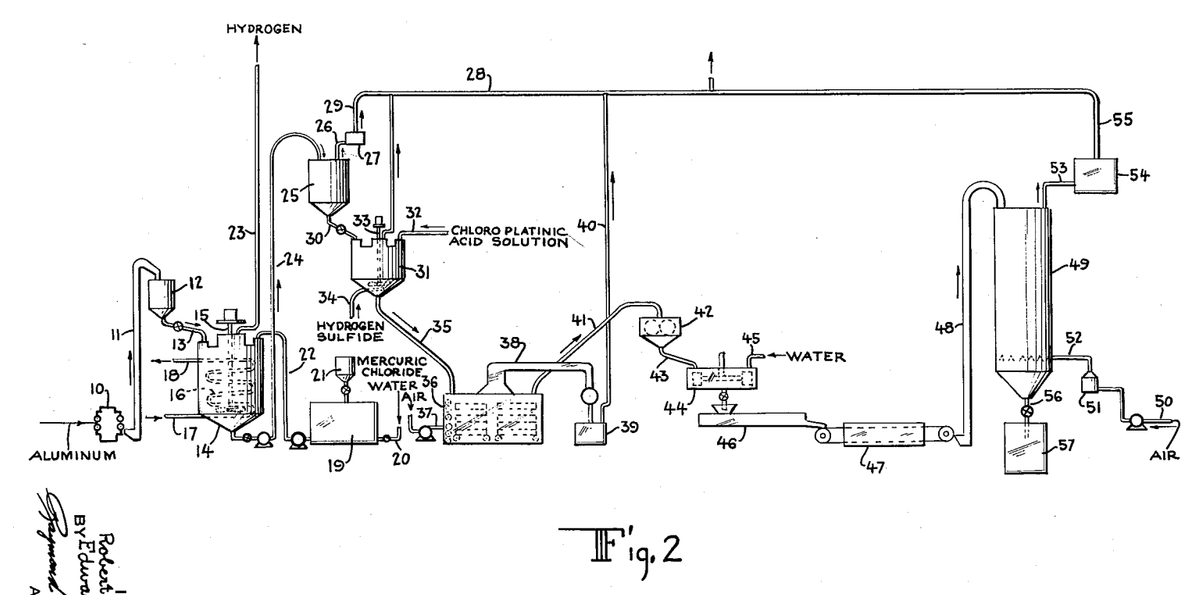

The manufacture of the catalyst may be carried out in any suitable type of equipment. Thus the operation may be carried out in continuous or batch-wise fashion. In FIGURE 2 of the attached drawing there is shown, in diagrammatic form, suitable apparatus and procedure for manufacturing the present alumina-platinum catalyst. Referring more particularly to this figure, aluminum in the form of billets is introduced into a milling machine 10 and milled therein to produce aluminum shavings of not more than about 0.008 inch in smallest dimensions.

The resulting aluminum shavings are elevated by a hoist 11 to feed vessel 12 from which they are introduced through conduit 13 to reactor 14. Reactor 14 is provided with a stirrer 15 and also since the desired reaction between amalgamated aluminum and water is exothermic with a cooling coil 16, through which cold water is introduced via conduit 17 and withdrawn through outlet 18. An aqueous solution of mercuric chloride is prepared in tank 19 with water introduced through conduit 20 and mercuric chloride introduced from storage vessel 21. The solution of mercuric chloride solution is pumped from tank 19 through conduit 22 to reactor 14. Reaction between the aluminum shavings and mercuric chloride solution takes place in reactor 14 with initial formation of aluminum amalgam and reaction of such amalgam with the excess water to produce alumina in the form of an aqueous slurry. The temperature of the reaction mixture is controlled within the range of 60° F. to 150° F. by the relative amounts of reactants employed and by the circulation of cooling liquid through coil 16. The pH of the reaction mixture is controlled, if necessary, to within the range of 7 to 10 by the addition of suitable ammonium compounds, for example ammonium carbonate, ammonium hydroxide or the like. Hydrogen is produced during course of the reaction and passes from the reactor through outlet 23. The reaction proceeds until the aluminum is substantially all converted into alumina.

The resulting slurry of alumina in water, is withdrawn from reactor 14 and pumped through conduit 24 to slurry tank 25. If desired, mercury entrained in the alumina slurry may be substantially removed therefrom by bringing the slurry in tank 25 by suitable means not shown to boiling temperature and maintaining such temperature for 0.5 to 6 hours. Under such conditions, the mercury in vaporous form passes off through outlet 26 to trap 27 with any remaining vaporous material being conducted to vent line 28 through conduit 29. As an alternate means of operation, the small amount of entrained mercury may be permitted to remain in the alumina slurry at this stage and subsequently removed therefrom during the drying and/or calcining steps. Also, it is feasible to remove a portion of the total entrained mercury from the alumina slurry before impregnation thereof and the remaining portion of the entrained mercury during the drying and/or calcination of the impregnated alumina.

The slurry of alumina either with or without prior removal of entrained mercury therefrom is conducted from tank 25 through conduit 30 to impregnator 31. Chloroplatinic acid solution is introduced into impregnator 31 through conduit 32. The slurry during impregnation is agitated by means of stirrer 33. Hydrogen sulfide is passed into the impregnator through conduit 34. After impregnation, the slurry is conveyed by outlet pipe 35 to drier 36 wherein the impregnated slurry is dried at a temperature in the approximate range of 240° F. to 450° F. in a slow stream of air introduced into the drier through inlet 37. Any residual mercury remaining in the slurry is vaporized passing overhead through conduit 38 to mercury trap 39. Other non-condensible gases or vapors contained in the overhead flow through conduit 40 to vent line 28.

The product from the drying operation is thereafter conveyed through suitable means 41 to a crusher 42 in which the dried product is ground to a fine particle size. The finely ground material is then conducted through line 43 to muller 44 wherein the material is mulled with water introduced therein through inlet conduit 45. The product is mulled to extrudable consistency and then conducted to extruder 46. The product is extruded through dies of suitable diameter and cut into lengths or particles of desired size. The so obtained particles are then passed through a belt drier 47 maintained at a temperature within the approximate range of 150 to 400° F. The resulting material is conveyed through elevator 48 to kiln 49. Air is introduced through conduit 50 to heater 51 and thereafter is conducted through line 52 to the kiln. The particle-form material passes downwardly through the kiln and is subjected to a calcination temperature in the approximate range of 650° F. to 1000° F. upon coming into contact with the counterflowing hot air. Water vapor and volatile materials including any remaining mercury are removed in the air stream passing through outlet 53. Mercury vapors, if present in such stream, are condensed to liquid mercury in trap 54. The remaining gaseous products pass overhead through conduit 55 to vent line 28. The catalyst product is removed from the bottom of kiln 49 through outlet 56 and passed into suitable collecting vessel 57.

The catalyst prepared in accordance with the above method may find use in a variety of processes. Thus, the catalyst may be used as a fixed bed in a reactor and the hydrocarbons or other reactants to be converted are passed therethrough. The catalyst may be used in the form of a moving bed wherein the hydrocarbon flow may be concurrent or countercurrent to the catalyst flow. The catalyst may also be used in a fluidized type of operation wherein the catalyst is carried in suspension in the hydrocarbon charge.

While the catalyst described hereinabove is particularly suitable for the reforming of gasoline, this catalyst may also be used for the dehydrogenation of naphthenes to produce aromatics, and the dehydrogenation of paraffins to produce olefins. The catalyst may also be employed for dehydrocyclization reactions such as the conversion of normal hexane to benzene. It is also contemplated that the catalyst will be used for effecting isomerization reactions and hydrogenation reactions as well as for effecting oxidation of hydrocarbons to form the corresponding oxygenated derivatives and for desulfurizing sulfur containing charge stocks.

The catalyst, however, as noted above is particularly suitable for use in reforming operations wherein hydrocarbon fractions such as naphthas, gasolines and kerosene are treated to improve the anti-knock characteristics thereof. These fractions are composed predominately of normal and slightly branched paraffinic hydrocarbons and naphthenic hydrocarbons together with small amounts of aromatic hydrocarbons. During reforming a multitude of reactions take place including isomerization, aromatization, dehydrogenation, cyclization, etc. to yield a product having an increased content of aromatics and highly-branched paraffins. Thus, in reforming, it is desired to dehydrogenate the naphthenic hydrocarbons to produce aromatics, to cyclize the straight chain paraffinic hydrocarbons to form aromatics, to isomerize the normal and slightly branched paraffins to yield highly branched chain paraffins and to effect a controlled type of cracking which is selective both in quality and in quantity.

Normal and slightly branched chain paraffinic hydrocarbons of the type contained in the above fractions have relatively low octane ratings. Highly branched-chain paraffinic hydrocarbons, on the other hand, are characterized by high octane ratings. Accordingly, one objective of reforming is to effect isomerization of the normal and slightly branched-chain paraffins to more highly branched-chain paraffins. Since aromatic hydrocarbons have much higher octane ratings than naphthenic hydrocarbons, it is also an objective of reforming to simultaneously produce aromatics in good yield. The production of aromatic hydrocarbons during reforming is effected by dehydrogenation of the naphthenic hydrocarbons and dehydrocyclization of the paraffinic hydrocarbons. Aromatic hydrocarbons are also produced by isomerization of alkyl cyclopentanes to cyclohexanes which thereafter undergo dehydrogenation to form the desired aromatics.

Controlled or selective cracking is highly desirable during reforming since such will result in a product of improved anti-knock characteristics. As a general rule, the lower molecular weight hydrocarbons exhibit a higher octane number, and a gasoline product of lower average molecular weight will usually have a higher octane number. The splitting or cracking of carbon to carbon linkages must, however, be selective and should be such as not to result in substantial decomposition of normally liquid hydrocarbons into normally gaseous hydrocarbons. The selective cracking desired accordingly ordinarily involves center cracking of paraffin molecules to minimize methane and ethane formation. Uncontrolled cracking, on the other hand, would result in decomposition of normally liquid hydrocarbons into normally gaseous hydrocarbons. For example, non-selective cracking of normal octane would ultimately lead to eight molecules of methane. Since methane, ethane, and propane cannot be used in gasoline, they constitute a loss in the process and the production of excessive amounts of these lower paraffins accordingly is to be avoided. Butanes, on the other hand, tend to increase the octane rating of gasoline but the effective amount of butane present in the finished gasoline is limited by the maximum permissible vapor pressure.

Uncontrolled cracking, moreover, generally results in rapid formation and deposition on the catalyst of large quantities of a carbonaceous material generally referred to as "coke." The production of coke not only results in decreased yields of gasoline but the deposition thereof on the catalyst surface diminishes or destroys its catalyzing effect and results in shorter processing periods with the accompanying necessity of frequent regeneration by burning the coke therefrom. In those instances where the activity of the catalyst is destroyed, it is necessary to shut down the unit, remove the deactivated catalyst, and replace it with new catalyst. Such practice obviously is time-consuming and inefficient, imparting a greater overall expense to the reforming operation.

When reforming is carried out in the presence of hydrogen under pressure, the formation of coke is to some extent inhibited. Accordingly, it has been general practice to effect reforming in the presence of hydrogen and such processes have sometimes been referred to as hydroforming. An increase in hydrogen pressure during reforming results in increasing the temperature at which aromatization, including dehydrogenation and dehydrocyclization, occurs. The isomerization reactions taking place, on the other hand, are independent of pressure. Reforming in the presence of a catalyst which provides maximum isomerization at relatively low temperatures is disadvantageous in operations wherein pressure conditions have elevated the temperature range of the aromatization reaction. To achieve maximum conversion to high octane gasoline, maximum isomerization should occur at temperatures sufficiently high to effect good conversion to aromatic hydrocarbons.

Accordingly, the choice of catalyst for promoting reforming of hydrocarbons to gasolines of enhanced octane rating is dependent on several factors. Such catalyst should desirably be capable of effecting reforming in a controlled and selective manner as discussed above to yield a product of improved anti-knock characteristics. The catalyst selected should, further, be resistant to poisoning and should also desirably be characterized by high stability and be capable of easy regeneration. It has been discovered that a catalyst prepared in accordance with the process set forth herein has the above defined characteristics.

Reforming, in accordance with the present process, is generally carried out at a temperature between about 700° F. and 1000° F. and preferably at a temperature between about 850° F. and about 975° F. The pressure during reforming is generally within the range of about 100 to about 1000 pounds per square inch gauge and preferably between about 200 and about 700 pounds per square inch gauge. The liquid hourly space velocity employed, i.e. the liquid volume of hydrocarbon per hour per volume of catalyst is between about 0.1 and about 10 and preferably between about 0.5 and about 4. In general, the molar ratio of hydrogen to hydrocarbon charge employed is between about 1 and about 20 and preferably between about 4 and about 12.

Hydrocarbon charge stocks undergoing reforming, in accordance with this invention, comprise mixtures of hydrocarbons and particularly petroleum distillates boiling within the approximate range of 60° F. to 450° F., which range includes naphthas, gasolines and kerosene. The gasoline fraction may be a full boiling range gasoline. It is, however, preferred to use a selected fraction, such as naphtha having an initial boiling point of between about 150° F. and about 250° F. and an end boiling point of between about 350° F. and about 425° F.

The following examples will serve to illustrate the invention without limiting the same:

*Example 1*

Three hundred twenty-seven (327) parts by weight of 0.008 inch aluminum turnings (99.99% pure) having a surface area of about 2600 square inches per pound were contacted with approximately 9300 parts by weight of water containing about 3.1 parts by weight of mercuric chloride. The aluminum turnings were covered with the mercuric chloride solution and the temperature of the reaction mixture was controlled at 131° F. The pH of the reaction mixture was about 8.8. The reaction proceeded for about 15 hours at which time the aluminum was completely reacted. The resulting product was a hydrous alumina slurry containing about 616 parts by weight of alumina.

The alumina slurry was slowly contacted with an aqueous solution containing about 520 parts by weight of water and 9.3 parts by weight of chloroplatinic acid while agitating. Thereafter, 810 parts by weight of hydrogen sulfide-water saturated with $H_2S$ at 81° F. were added and the mixture thoroughly agitated. The slurry so treated was then dried in air at 240° F. for 16 hours to give a product of about 68 percent solids. The dried product was ground to a particle size of less than about 325 mesh (Tyler). The ground material was then pelleted using a stearic acid lubricant to make pellets of ⅛" diameter and 1/16" height. The resulting pellets were calcined at a temperature of 650 to 925° F. initially in nitrogen and thereafter in air. The final catalytic composite of alumina contained 0.59 weight percent of platinum and 0.75 weight percent of chlorine.

The above catalyst was employed in reforming a Mid-Continent naphtha having a boiling range of 200 to 380° F. The reforming operation was carried out at 500 p.s.i.g. pressure a liquid hourly space velocity of 2, a hydrogen to hydrocarbon mole ratio of 10. The reforming activity, as measured by the reactor inlet temperature required to yield a 98 octane number product, was 908° F.

*Example 2*

A catalyst was prepared as in Example 1 with the modification that the temperature of the reaction mixture of aluminum turnings and mercuric chloride was controlled at 150° F. The pH of the reaction mixture remained at 8.8 while the aluminum turnings were completely reacted after about 8 hours. The resulting slurry was impregnated following the procedure of Example 1 to give a final catalyst of identical composition.

This catalyst was employed in reforming the naphtha charge and under the conditions described in Example 1. The reforming activity, in the case of this catalyst, however, was lower than that of the catalyst of Example 1, requiring a reactor inlet temperature of 926° F. to yield a 98 octane number product.

It will be seen from the above comparative examples that correlation of temperature and pH of the reaction mixtures of aluminum turnings and mercuric chloride leading to the formation of alumina in accordance with the teachings of the invention gave rise to a resulting catalyst of substantially improved reforming activity as compared with a catalyst in which the defined correlation was not observed.

*Example 3*

Two hundred sixty (260) parts by weight of 0.005" thick by ¾" length aluminum turnings (99.99% pure) were covered with approximately 2480 parts by weight of water containing about 0.62 part by weight of mercuric chloride. The mixture was mildly agitated throughout the reaction period which was 24 hours at 100° F. The pH of the reaction mixture was in the range 8.5 to 9. Unreacted aluminum in an amount of 1.6 parts by weight was removed by screening the resulting hydrous alumina slurry which had an alumina content, on a dry basis, of 18.65% by weight.

The alumina slurry was impregnated with chloroplatinic acid solution to 0.35% by weight of platinum and thereafter sulfided with hydrogen sulfide saturated water. The slurry so treated was then dried for 16 hours at 240° F. The dried product was ball milled to a particle size of less than about 325 mesh (Tyler). The ground material was then mulled with a sufficient quantity of water to make the product extrudable, after which the material was extruded to ⅟₁₆" diameter pellets. The resulting pellets, after being dried 8 hours at 240° F., were calcined to 925° F. in dried air flowing at a rate of 5 volumes per volume of pellets per minute, followed by a nitrogen purge and ½ hour treatment in hydrogen flowing at a rate of 1 volume per volume of pellets per minute. The final catalytic composite of alumina contained 0.40 weight percent of platinum and 0.39 weight percent of chlorine and had a surface area of 276 square meters per gram and an apparent density of 0.72 grams per cubic centimeter.

This catalyst was employed in reforming the naphtha charge and under the conditions described in Example 1. The reforming activity, as measured by the reactor inlet temperature required to yield a 98 octane number product, was 913° F.

*Example 4*

One hundred thirty (130) parts by weight of 0.005" thick by ¾" length aluminum turnings (99.99% pure) were covered with approximately 1240 parts by weight of water containing about 0.31 parts by weight of mercuric chloride. The mixture was maintained at 100° F. for 23.5 hours, the pH of the reaction mixture being in the range of 8.5 to 9. Unreacted aluminum in an amount of 8.4 parts by weight was removed by screening the resulting hydrous alumina slurry which had an alumina content, on a dry basis, of 21.2% by weight.

The alumina slurry was impregnated with chloroplatinic acid solution to 0.35% by weight of platinum and thereafter sulfided with hydrogen sulfide saturated water to 0.77 part by weight of hydrogen sulfide per unit part by weight of platinum. The slurry so treated was then dried for 16 hours at 240° F. The dried product was ball milled to a particle size of less than about 325 mesh (Tyler). The ground product was then mulled with a sufficient quantity of water to make the product extrudable, after which the material was extruded to ⅟₁₆" diameter pellets. The resulting pellets, after being dried 8 hours at 240° F., were calcined to 925° F. with dry air flow through the bed at 5 volumes per volume of pellets per minute, followed by a nitrogen purge and ½ hour treatment in hydrogen. The final catalytic composite of alumina contained 0.40 weight percent of platinum and 0.38 weight percent of chlorine and had a surface area of 254 square meters per gram and an apparent density of 0.73 grams per cubic centimeter.

*Example 5*

One hundred thirty (130) parts by weight of 0.005" thick by ¾" length aluminum turnings (99.99% pure) were covered with approximately 1240 parts by weight of water containing about 0.31 parts by weight mercuric chloride. The mixture was maintained at 120° F. for 14 hours, the pH of the reaction mixture being in the range of 8.5 to 9. The resulting slurry of alumina was stirred for an additional 56 hours at room temperature and thereafter screened to remove 0.8 part by weight of alumina metal. The slurry had a content of 574 p.p.m. of mercury based on the alumina.

A total of 2500 parts by weight of steam, generated by boiling water, were passed through 1456 parts by weight of the above slurry. After such treatment, the slurry had a content of 8.5 p.p.m. of mercury based on the alumina and contained, on a dry basis, 15.53% by weight of alumina.

The alumina slurry was then impregnated with chloroplatinic acid solution, sulfided with hydrogen sulfide saturated water and dried for 16 hours at 240° F. The dried product was ball milled to a particle size of less than about 325 mesh (Tyler). The ground product was then mulled with water to an extrudable consistency and extruded to ⅟₁₆" diameter pellets. The resulting pellets, after being dried 8 hours at 240° F., were calcined to 925° F. in dried air, followed by a nitrogen purge and a final treat in hydrogen. The resulting catalytic composite of alumina contained 0.34 weight percent of platinum and 0.38 weight percent of chlorine and had a surface area of 297 square meters per gram and an apparent density of 0.92 gram per cubic centimeter.

This catalyst when employed in reforming the naphtha charge and under the conditions described in Example 1 gave a reforming activity, as measured by the reactor inlet temperature required to yield a 98 octane number product, of 908° F.

It is to be understood that the above description is merely illustrative of preferred embodiments of the invention, of which many variations may be made by those skilled in the art without departing from the spirit thereof.

We claim:

1. A process for manufacture of a catalytic composite consisting essentially of alumina impregnated with a minor proportion of a platinum metal which comprises reacting substantially pure aluminum with excess water, in the absence of acid, and in the presence of a material selected from the group consisting of mercury and a mercury compound in a catalytic amount corresponding to between about 0.1% and about 10% by weight of mercury relative to the amount of aluminum, controlling the temperature of the reaction mixture to within the range of 60° F., to 140° F. and maintaining the pH thereof within the range of 7 to 10 until at least a major proportion of the aluminum is converted into alumina in the form of an aqueous slurry, contacting the alumina slurry so obtained, with a solution of a platinum metal compound which composites with the alumina an amount of between about 0.01 and about 5% by weight of platinum metal and thereafter drying and calcining the resulting product.

2. A process for manufacture of a catalytic composite consisting essentially of alumina impregnated with a minor proportion of a platinum metal which comprises reacting substantially pure aluminum with excess water, in the absence of acid, and in the presence of a material selected from the group consisting of mercury and a mercury compound in a catalytic amount corresponding to between about 0.1% and about 10% by weight of mercury relative to the amount of aluminum, controlling the temperature of the reaction mixture to within the range of 60° F. to 140° F. and maintaining the pH thereof within the range of 7 to 10 until at least a major proportion of the aluminum is converted to alumina in the form of an aqueous slurry having a solids content of between about 10 and about 20% by weight, contacting the alumina slurry so obtained without intermediate washing, filtration or drying thereof, with a solution of a platinum metal compound which composites with the alumina an amount between about 0.01 and about 5% by weight of platinum metal and thereafter drying and calcining the resulting product.

3. A process for manufacture of a catalytic composite consisting essentially of alumina impregnated with a minor proportion of a platinum metal which comprises reacting substantially pure aluminum in the form of pieces having at least one dimension less than 0.008" with excess water, in the absence of acid, and in the presence of a material selected from the group consisting of mercury and a mercury compound in a catalytic amount corresponding to between about 0.1% and about 1% by weight of mercury relative to the amount of aluminum, controlling the temperature of the reaction mixture to within the range of 60° F. to 140° F. and maintaining the pH thereof within the range of 7 to 10 until substantially all of the aluminum is converted into alumina in the form of an aqueous slurry, contacting the alumina slurry so obtained, without prior removal of water therefrom, with a solution of a platinum metal compound which composites with the alumina an amount of between about 0.01 and about 5% by weight of platinum metal and thereafter drying and calcining the resulting product.

4. A process for manufacture of a catalytic composite consisting essentially of alumina impregnated with a minor proportion of a platinum metal which comprises reacting, with agitation, substantially pure aluminum in the form of pieces having at least one dimension less than 0.008" with excess water, in the absence of acid, and in the presence of a material selected from the group consisting of mercury and a mercury compound in a catalytic amount corresponding to between about 0.1% and about 1% by weight of mercury relative to the amount of aluminum, controlling the temperature of the reaction mixture to within the range of 60° F. to 140° F. and maintaining the pH thereof within the range of 7 to 10 until at least a major proportion of the aluminum is converted to alumina in the form of an aqueous slurry, contacting the alumina slurry so obtained without intermediate washing, filtration or drying thereof, with a solution of a platinum metal compound which composites with the alumina an amount of between about 0.01 and about 5% by weight of platinum metal and thereafter drying and calcining the resulting product.

5. A process for manufacture of a catalytic composite consisting essentially of alumina impregnated with a minor proportion of a platinum metal which comprises reacting, substantially pure aluminum having a surface area greater than about 1000 square inches per pound, with excess water, in the absence of acid, and in the presence of a material selected from the group consisting of mercury and a mercury compound in a catalytic amount corresponding to between about 0.1% and about 10% by weight of mercury relative to the amount of aluminum, controlling the temperature of the reaction mixture to within the range of 110° F. to 140° F. and maintaining the pH thereof within the range of 8 to 9.5 until the aluminum is substantially completely converted into alumina in the form of an aqueous slurry, contacting the alumina slurry so obtained, without prior removal of water therefrom, with a solution of a platinum metal compound which composites with the alumina an amount of between about 0.01 and about 5% by weight of platinum metal and thereafter drying and calcining the resulting product.

6. A process for manufacture of a catalytic composite consisting essentially of alumina impregnated with a minor proportion of platinum which comprises reacting substantially pure aluminum having a surface area greater than about 1000 square inches per pound with water in the liquid phase in an amount sufficient to cover the aluminum, in the absence of acid, and in the presence of a material selected from the group consisting of mercury and a mercury compound in a catalytic amount corresponding to between about 0.1% and about 1% by weight of mercury relative to the amount of aluminum, controlling the temperature of the reaction mixture to within the range of 110° F. to 140° F. and maintaining the pH thereof within the range of 8 to 9.5 until at least a major proportion of the aluminum is converted into alumina in the form of an aqueous slurry, having a solids content of between about 10 and about 20% by weight, contacting with alumina slurry so obtained without intermediate washing, filtration or drying thereof with a solution of a platinum compound and with hydrogen sulfide to composite with the alumina an amount of between about 0.01 and about 1% by weight of platinum, drying the resulting composite at a temperature of between about 240 and about 450° F. and thereafter calcining the dried composite at a temperature between about 650 and 1000° F.

7. A process for manufacture of a catalytic composite consisting essentially of alumina impregnated with a minor proportion of platinum which comprises reacting substantially pure aluminum having a surface area greater than about 1000 square inches per pound with excess water, in the absence of acid, and in the presence of mercuric chloride in a catalytic amount of between about 0.25% and about 0.50% by weight of the aluminum, controlling the temperature of the reaction mixture to within the range of 60° F. to 140° F. and maintaining the pH thereof within the range of 7 to 10 until at least a major proportion of the aluminum is converted into alumina in the form of an aqueous slurry having a solids content of between about 10 and about 20% by weight, contacting the alumina slurry so obtained, without prior removal of water therefrom with a solution of chloroplatinic acid which composites with the alumina an amount of between about 0.01 and about 1% by weight of platinum and thereafter drying and calcining the resulting product.

8. A process for manufacture of a catalytic composite consisting essentially of alumina impregnated with a minor proportion of platinum which comprises reacting substantially pure aluminum having a surface area greater than about 1000 square inches per pound with excess water, in the absence of acid, and in the presence of mercuric chloride in a catalytic amount of between about 0.25% and about 0.50% by weight of the aluminum, controlling the temperature of the reaction mixture to within the range of 110 to 140° F. and maintaining the pH thereof within the range of 8 to 9.5 until substantially all of the aluminum is converted into alumina in the form of an aqueous slurry characterized by a solids content of between about 10 and about 20% by weight and a halogen content of less than 0.1% by weight, contacting the alumina slurry so obtained, without prior removal of water therefrom, with a solution of chloroplatinic acid and thereafter with hydrogen sulfide to composite with the alumina an amount between about 0.01 and about 1% by weight of platinum and thereafter drying and calcining the resulting product.

9. A process for manufacture of a catalytic composite consisting essentially of alumina impregnated with a minor proportion of platinum which comprises reacting substantially pure aluminum having a surface area greater than about 1000 square inches per pound with excess water, in the absence of acid, and in the presence of a material selected from the group consisting of mercury and a mercury compound in a catalytic amount corresponding to between about 0.1% and about 10% by weight of mercury relative to the amount of aluminum, controlling the temperature of the reaction mixture to within the range of 60° F. to 140° F. and the pH within the range of 7.4 to 10, the reaction temperature and pH being correlated to lie within the area ABCDE of FIGURE 1 of the accompanying drawing until at least a major proportion of the aluminum is converted into alumina in the form of an aqueous slurry having a solids content of between about 10 and about 20% by weight, contacting the alumina slurry so obtained without prior removal of water therefrom with a solution of a platinum compound which composites with the alumina an amount of between about 0.01 and about 1% by weight of platinum and thereafter drying and calcining the resulting product.

10. A process for manufacture of a catalytic composite consisting essentially of alumina impregnated with a minor proportion of platinum which comprises reacting substantially pure aluminum having a surface area greater than about 1000 square inches per pound, with excess water, in the absence of acid, and in the presence of mercuric chloride in a catalytic amount of between about 0.25% and about 0.50% by weight of the aluminum, controlling the temperature of the reaction mixture to within the range of 110° F. to 140° F. and maintaining the pH thereof within the range of 8 to 9.5, the reaction temperature and pH being correlated to lie within the area FGHIJ of FIGURE 1 of the accompanying drawing, until substantially all of the aluminum is converted into alumina in the form of an aqueous slurry having a solids content of between about 10 and about 20% by weight, contacting the alumina slurry so obtained without intermediate washing, filtration or drying thereof, with a solution of chloroplatinic acid which composites with the alumina an amount of between about 0.01 and about 1% by weight of platinum and thereafter drying and calcining the resulting product.

11. A process for manufacture of a catalytic composite consisting essentially of alumina impregnated with a minor proportion of platinum which comprises reacting with agitation substantially pure aluminum having a surface area greater than about 1000 square inches per pound, with excess water, in the absence of acid, and in the presence of a material selected from the group consisting of mercury and a mercury compound in a catalytic amount corresponding to between about 0.1% and about 1% by weight of mercury relative to the amount of aluminum, controlling the temperature of the reaction mixture to within the range of 60° F. to 140° F. and maintaining the pH thereof within the range of 7 to 10 until at least a major proportion of the aluminum is converted into alumina in the form of an aqueous slurry, contacting the resulting alumina slurry without prior removal of water therefrom with a solution of a platinum compound which composites with the alumina an amount of between about 0.01 and about 1% by weight of platinum and thereafter drying and calcining the resulting product.

12. A process for manufacture of a catalytic composite consisting essentially of alumina impregnated with a minor proportion of platinum which comprises reacting, in the absence of acid, substantially pure aluminum with water in the liquid phase in an amount sufficient to cover the aluminum in the presence of mercuric chloride in a catalytic amount of between about 0.25% and about 0.50% by weight of aluminum, controlling the temperature of the reaction mixture to within the range of 110° F. to 140° F. and maintaining the pH thereof within the range of 8 to 9.5, said temperature and pH being correlated to lie within the area FGHIJ of FIGURE 1 of the accompanying drawing, until substantially all of the aluminum is converted into alumina in the form of an aqueous slurry having a solids content of between about 10 and about 20% by weight, and a halogen content of less than 0.1% by weight, contacting the alumina slurry so obtained without intermediate washing, filtration or drying thereof, with a solution of chloroplatinic acid and with hydrogen sulfide to composite with the alumina an amount of between about 0.01 and about 1% by weight of platinum, drying the resulting composite at a temperature between about 240 and about 450° F. in a slow circulating stream of air for at least six hours to yield a resulting product having a solids content of between about 50 and about 68%, grinding the dried product, mulling the ground material with sufficient water to form an extrudable mass, extruding the resulting mass to form pellets and calcining the resulting pellets in air at a temperature of between about 650° F. and about 1000° F. for 2 to 36 hours.

13. A process for reforming a hydrocarbon mixture which comprises contacting the same under reforming conditions with a catalyst consisting essentially of alumina impregnated with a minor proportion of a platinum metal prepared by reacting substantially pure aluminum with excess water, in the absence of acid, and in the presence of a material selected from the group consisting of mercury and a mercury compound in a catalytic amount corresponding to between about 0.1% and about 10% by weight of mercury relative to the amount of aluminum, controlling the temperature of the reaction mixture to within the range of 60° F. to 140° F. and maintaining the pH thereof within the range of 7 to 10 until at least a major proportion of the aluminum is converted into alumina in the form of an aqueous slurry, contacting the alumina slurry so obtained with a solution of a platinum metal compound which composites with the alumina an amount of between about 0.01 and about 5% by weight of platinum metal and thereafter drying and calcining the resulting product.

14. A process for reforming a petroleum distillate boiling in the approximate range of 60° F. to 450° F. which comprises contacting the same at a temperature between about 700° F. and about 1000° F. at a liquid hourly space velocity between about 0.1 and about 10 in the presence of hydrogen under a pressure of between about 100 and about 1000 pounds per square inch gauge and a molar ratio of hydrogen to hydrocarbon between about 1 and about 20 with a catalyst consisting essentially of alumina impregnated with a minor proportion of a platinum metal prepared by reacting, with agitation, substantially pure aluminum in the form of pieces having at least one dimension less than 0.008″ with excess water, in the absence of acid, and in the presence of a material selected from the group consisting of mercury and a mercury compound in a catalytic amount corresponding to between about 0.1% and about 1% by weight of mercury relative to the amount of aluminum, controlling the temperature of the reaction mixture to within the range of 60° F. to 140° F. and maintaining the pH thereof within the range of 7 to 10 until at least a major proportion of the aluminum is converted to alumina in the form of an aqueous slurry, contacting the alumina slurry so obtained without intermediate washing, filtration or drying thereof, with a solution of a platinum metal compound which composites with the alumina an amount of between about 0.01 and about 5% by weight of platinum metal and thereafter drying and calcining the resulting product.

15. A process for reforming a petroleum distillate boiling in the approximate range of 60° F. to 450° F. which comprises contacting the same at a temperature between about 700° F. and about 1000° F. at a liquid hourly space velocity between about 0.1 and about 10 in the presence of hydrogen under a pressure of between about 100 and about 1000 pounds per square inch gauge and a molar ratio of hydrogen to hydrocarbon between about 1 and about 20 with a catalyst consisting essentially of alumina impregnated with a minor proportion of platinum prepared by reacting substantially pure aluminum having a surface area greater than about 1000 square inches per pound, with excess water, in the absence of acid, and in the presence of a material selected from the group consisting of mercury and a mercury compound in a catalytic amount corresponding to between about 0.1% and about 10% by weight of mercury relative to the amount of aluminum, controlling the temperature of the reaction mixture to within the range of 110° F. to 140° F. and maintaining the pH thereof within the range of 8 to 9.5 until the aluminum is substantially completely converted into alumina in the form of an aqueous slurry, contacting the alumina slurry so obtained, without prior removal of water therefrom, with a solution of a platinum metal compound which composites with the alumina an amount of between about 0.01 and about 5% by weight of platinum metal and thereafter drying and calcining the resulting product.

16. A process for reforming a petroleum distillate boiling within the approximate range of 60° F. to 450° F. which comprises contacting the same at a temperature between about 850 and 975° F. at a liquid hourly space velocity between about 0.5 and about 4 in the presence of hydrogen at a pressure between about 200 and about 700 pounds per square inch gauge and a molar ratio of hydrogen to hydrocarbon between about 4 and about 12 with a catalyst consisting essentially of alumina impregnated with a minor proportion of platinum prepared by reacting substantially pure aluminum having a surface area greater than about 1000 square inches per pound with excess water, in the absence of acid, and in the presence of a material selected from the group consisting of mercury and a mercury compound in a catalytic amount corresponding to between about 0.1% and about 10% by weight of mercury relative to the amount of aluminum, controlling the temperature of the reaction mixture to within the range of 60° F. to 140° F. and the pH within the range of 7.4 to 10, the reaction temperature and pH being correlated to lie within the area ABCDE of FIGURE 1 of the accompanying drawing until at least a major proportion of the aluminum is converted into alumina in the form of an aqueous slurry having a solids content of between about 10 and about 20% by weight, contacting the alumina slurry so obtained, without prior removal of water therefrom, with a solution of a platinum compound which composites with the alumina an amount of between about 0.01 and about 1% by weight of platinum and thereafter drying and calcining the resulting product.

17. A process for reforming a petroleum distillate boiling within the approximate range of 60° F. to 450° F. which comprises contacting the same at a temperature between about 850 and 975° F. at a liquid hourly space velocity between about 0.5 and about 4 in the presence of hydrogen at a pressure between about 200 and about 700 pounds per square inch gauge and a molar ratio of hydrogen to hydrocarbon between about 4 and about 12 with a catalyst consisting essentially of alumina impregnated with a minor proportion of platinum prepared by reacting substantially pure aluminum having a surface area greater than about 1000 square inches per pound, with excess water, in the absence of acid and in the presence of mercuric chloride in a catalytic amount of between about 0.25% and about 0.50% by weight of the aluminum, controlling the temperature of the reaction mixture to within the range of 110° F. to 140° F. and maintaining the pH thereof within the range of 8 to 9.5, the reaction temperature and pH being correlated to lie within the area FGHIJ of FIGURE 1 of the accompanying drawing, until substantially all of the aluminum is converted into alumina in the form of an aqueous slurry having a solids content of between about 10 and about 20% by weight, contacting the alumina slurry so obtained without intermediate washing, filtration or drying thereof, with a solution of chloroplatinic acid which composites with the alumina an amount of between about 0.01 and about 1% by weight of platinum and thereafter drying and calcining the resulting product.

References Cited in the file of this patent

UNITED STATES PATENTS

| | | |
|---|---|---|
| 2,643,935 | Halverson | June 30, 1953 |
| 2,733,219 | Bloch | Jan. 31, 1956 |
| 2,787,522 | Lefrancois | Apr. 2, 1957 |
| 2,804,433 | Hervert et al. | Aug. 27, 1957 |
| 2,840,529 | Lefrancois | June 24, 1958 |
| 2,867,588 | Keith et al. | Jan. 6, 1959 |

UNITED STATES PATENT OFFICE
CERTIFICATE OF CORRECTION

Patent No. 3,003,952            October 10, 1961

Robert H. Cramer et al.

It is hereby certified that error appears in the above numbered patent requiring correction and that the said Letters Patent should read as corrected below.

Column 14, line 11, for "with" read -- the --.

Signed and sealed this 3rd day of April 1962.

(SEAL)
Attest:

ERNEST W. SWIDER
Attesting Officer

DAVID L. LADD
Commissioner of Patents